United States Patent Office 3,274,650
Patented Sept. 27, 1966

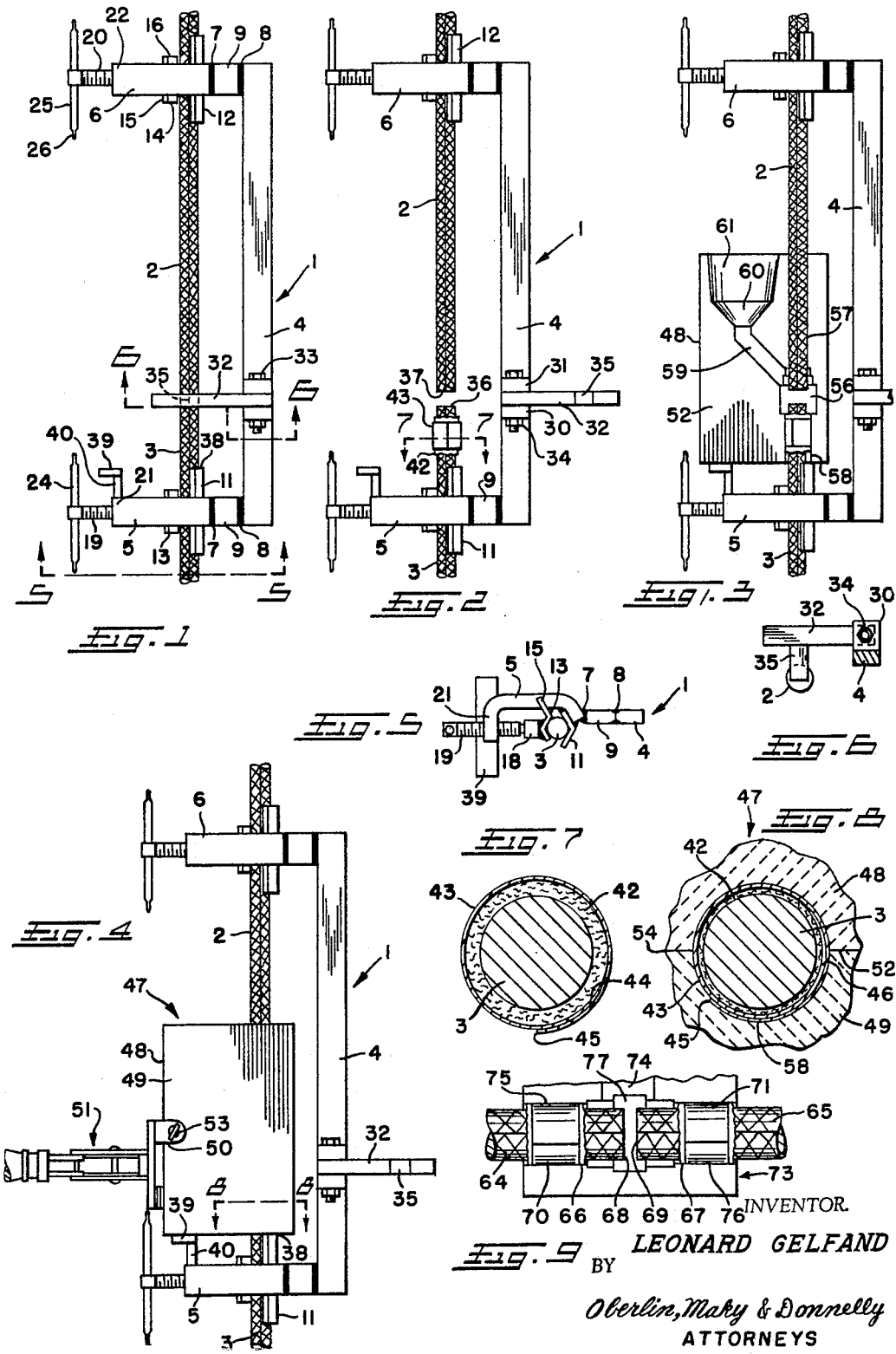

3,274,650
METHOD AND APPARATUS FOR JOINING
METAL PARTS
Leonard Gelfand, South Euclid, Ohio, assignor to Erico Products, Inc., Cleveland, Ohio, a corporation of Ohio
Filed Apr. 8, 1964, Ser. No. 358,214
7 Claims. (Cl. 22—58)

This invention relates generally as indicated to a method and apparatus for joining metal parts and more particularly to an exothermic welding process and apparatus for joining elongated metal parts such as steel reinforcing bars, cable, rails, and the like.

The exothermic welding process for joining metal parts is widely known, a liquid or molten metal being produced by an exothermic reaction mixture of the general type disclosed, for example, in Patent No. 2,229,045 to Charles A. Cadwell. Such reaction mixture may be utilized with apparatus such as that disclosed in Burke Patent No. 3,004,310 assigned to Erico Products, Inc. of Cleveland, Ohio, for joining the ends of cable, bar, and the like.

Where the metal parts to be joined have smooth exterior surfaces, the molten or liquid metal may be contained in refractory molds having recesses therein conforming to the metal parts. However, where the metal parts to be joined have irregular exterior surfaces such as in the case with metal reinforcing bars, cables, and the like, it becomes a problem to prevent molten metal leakage from the refractory or graphite mold. In the joining of such irregular surface metal parts, a compressible refractory batt material is employed to seal the metal part with respect to the graphite mold enclosing the same. However, the use of the refractory batt seal complicates and lengthens the welding procedures. It has been attempted to provide the graphite molds with special grooves surrounding the parts to be joined to contain the compressible refractory batt material, but this has proven unsatisfactory since a more complex and expensive mold is required. Moreover, leakage of weld metal has a tendency to break up the grooved section of the mold which contains the compressible refractory batt material thus reducing mold life. Furthermore, the compressible refractory material still has a tendency to get into the parting line of the mold preventing a complete mold closure and thus subsequent weld metal leakage and an improper weld joint.

The joining of reinforcing bars, especially column or vertical joints in the field, can be a difficult and time consuming task. The upper bar to be joined to the lower bar must generally be supported from overhead in a substantially plumb or predetermined position and properly spaced at the joint to be made. Accordingly, a fixture which will hold the metal parts to be joined in the proper spaced relationship as well as support the refractory mold which encloses the ends of the bar is highly to be desired.

It is accordingly a principal object of the present invention to provide a simplified field fixture for holding reinforcing bars and the like in the proper position and vertically spaced for exothermic weld joining.

Another principal object is the provision of apparatus for joining metal parts by an exothermic welding process utilizing a compressible refractory batt material to seal the parts and the refractory mold while yet employing a mold of extremely simplified construction.

Still another principal object is the provision of a simplified method or welding procedure for joining metal parts end to end.

A further principal object is the provision of a unique seal assembly with the above apparatus and method.

Another object is the provision of an exothermic welding fixture which will properly clamp and support reinforcing bars and the like in end-to-end relationship for convenient application of a refractory mold for joining such bars.

Yet another object is the provision of exothermic welding apparatus utilizing a refractory batt sealing material which may be held directly to the part to be joined by an irresilient retainer which will also ensure that the sealing material will not become interposed between the halves of the graphite mold.

Still another object is the provision of simplified apparatus for joining metal parts end to end yet still producing a high quality weld joint.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principles of the invention may be employed.

In said annexed drawing:

FIG. 1 is a fragmentary side elevation showing a fixture in accordance with the present invention in position properly spacing and holding the parts to be joined;

FIG. 2 is a side elevation similar to FIG. 1 illustrating the next step in the procedure;

FIG. 3 is a side elevation similar to FIGS. 1 and 2 illustrating the further step in the welding procedure;

FIG. 4 is a side elevation similar to FIGS. 1 through 3 illustrating the final step in the procedure;

FIG. 5 is a fragmentary horizontal section taken substantially on the line 5—5 of FIG. 1;

FIG. 6 is a fragmentary horizontal section taken substantially on the line 6—6 of FIG. 1;

FIG. 7 is an enlarged horizontal section taken on the line 7—7 of FIG. 2 illustrating the refractory sealing material and the irresilient retainer therefor;

FIG. 8 is a fragmentary enlarged horizontal section taken substantially on the line 8—8 of FIG. 4 illustrating the refractory mold enclosing the sealing assembly; and FIG. 9 is a fragmentary vertical section illustrating the method and apparatus of the present invention utilized to join metal parts end to end in a horizontal relationship.

Referring now to the annexed drawing and more particularly to FIGS. 1 through 6, there is illustrated a fixture shown generally at 1 for holding the metal parts to be joined 2 and 3 in end-to-end relationship. Such metal parts are illustrated as deformed reinforcing bar for concrete and joint made may be a column splice. The fixture 1 comprises a vertically extending bar 4 from which at the ends thereof laterally project shallow C-shape arms 5 and 6, the profile configuration of which is shown more clearly in FIG. 5. Such arms may be fabricated to the vertically extending bar 4 by means of weldments indicated at 7 and 8. Spacers 9 form the proximal end of the C-shape arms to space the same from the vertically extending bar. The heel of each C-shape arm has secured thereto a vertically extending angle or trough shape fixed clamping jaw as indicated at 11 and 12 for the arms 5 and 6, respectively. Movable jaws 13 and 14 of similar configuration cooperate with the fixed jaws 11 and 12, respectively, each being provided with fingers 15 and 16.

As seen in FIG. 5, a hub 18 is secured as by welding to the back of the movable clamps or jaws 13 and 14 and such hub is axially fixed yet revolvably secured to the end of clamping screws 19 and 20 which are threaded into the bent distal ends 21 and 22 of the C-shape arms 5 and 6, respectively. The outer ends of the clamping screws 19 and 20 are provided with transverse apertures through which project pins 24 and 25 which may have flattened ends indicated at 26 to keep the pins or handles from falling out of the apertures in the clamping screws. The fingers 15 and 16 of the movable clamping jaws 13 and 14, which straddle the arms 5 and 6, keep the movable jaw from turning and serve to guide the jaw along the arm as the screw operates to open or close the clamping fixture.

As seen more clearly in FIGS. 1, 2 and 6, the vertical bar 4 is provided with two ears 30 and 31 between which is swingably secured an arm 32. The arm is thus secured to the ears by a cap screw 33 or like stud having a lock nut 34 threaded on the lower projecting end thereof. The arm 32 is provided with a lateral projection 35 which serves as a gauging stop to space the ends 36 and 37 of the metal parts to be joined 3 and 2, respectively. With the arm 32 swung to a position on the same side of the bar 4 as the C-shaped fixtures 5 and 6, the lower bar 3 may then be positioned in the lower clamping fixture 5 and the gauge 35 then serves to space the upper end 36 of the bar 3 the correct height above the top 38 of the trough or fixed clamping jaw 11 as well as above the top surface of the plate or support 39 secured to upright 40 on the distal end of the lower C-shape arm 5. With the movable jaw 13 firmly gripping the bar 3, the upper bar 2 may then be positioned in the upper clamping fixture with the bottom 37 thereof supported on the gauge 35. The upper clamping fixture may then be closed by moving the movable jaw 14 firmly into bar gripping position. With the bars thus aligned and clamped in the spaced end-to-end relationship, the arm 32 may then be swung away to the position shown in FIG. 2.

The next step in the bar splicing procedure is to wrap a strip of refractory batting indicated at 42 around the upper end of the lower bar 3 spaced slightly from the upper end 36 thereof. This refractory batting is held in place by a thin copper or like irresilient or inelastic metal shim 43 which is slightly more narrow than the width of the refractory batting strip 42. The shim 43 should be placed centrally of the batting 42 so that the batting projects slightly above and below as indicated. The shim is wrapped such that the ends 44 and 45 thereof overlap in the manner indicated in FIG. 7. Due to the irresilient character or lack of springiness in the material of the shim 43, it will retain its wrapped position substantially circularly enclosing the batt 42.

The next step in the splicing procedure is to enclose the ends to be joined of the bars 3 and 2 as well as the shim held batt 42 with a refractory mold indicated generally at 47 in FIG. 4. Such refractory mold is comprised of mating mold halves 48 and 49 which are secured respectively to the jaws 50 of a toggle clamping fixture 51. Such refractory molds and toggle clamping fixtures are generally conventional in the exothermic welding art.

In FIG. 3, the mold 47 is illustrated with the front mold half 49 removed as well as the toggle clamping fixture so that only the parting face 52 of the rear mold half 48 is shown. The mold halves may be removably secured to the jaws of the toggle fixture 51 by means of the thumb screws indicated at 53 in FIG. 4 and when the fixture 51 is opened, the refractory mold may readily be positioned over the spaced ends of the bars 2 and 3 and then closed and toggle locked in such closed position. In FIG. 8, the parting line 54 between the juxtaposed faces of the mold halves 48 and 49 is indicated.

Each mold half is provided with semi-circular grooves which will form a system of passages within the refractory mold when the mold halves are brought into mating engagement. These grooves and thus the mold passages are illustrated more clearly in FIG. 3. The mold is provided with a centrally disposed chamber 56 which will enclose the ends 36 and 37 of the bars 3 and 2 to be joined. A passage 57 extends vertically from the chamber 56 enclosing the end of the upper bar 2 and a slightly larger passage 58 extends vertically beneath the chamber 56 enclosing the upper end of the lower bar 3. Since the metal parts to be joined are illustrated as reinforcing bars, it will be appreciated that the passage 57 above the chamber 56 closely encloses the bar 2, but due to the surface deformations or irregularities therein, such passage 57 will not necessarily seal the bar 2 within the mold. The somewhat larger passage 58 extending beneath the chamber 56 accommodates not only the bar 3, but the batting 42 having the shim 43 circularly enclosing the same.

Extending in an upwardly inclined fashion from the chamber 56 is a passage 59 which communicates with the frusto-conical bottom portion 60 of crucible chamber 61 which will house a charge or cartridge of exothermic reaction material which when ignited will create a molten metal which will flow downwardly through the passage 59 and into the chamber 56. Such molten metal will fill the chamber 56 coalescing with the ends of the bar to be joined forming an exothermic weld splice between such bars. A cover, not shown, may be placed on top of the mold to protect the operator when the charge of exothermic material is ignited.

It can be seen that the predetermined position between the gauge 35 and the top 38 of the fixed jaw 11 as well as the support plate 39 ensures that the chamber 56 will be properly located to enclose the ends of the bar when the mold 47 is positioned on top of the edge 38 and the plate 39.

Ordinarily, the diameter of the passage 58 accommodating the lower bar will be somewhat smaller than the diameter of the sleeve or shim 43 surrounding the batt 42. Thus when the mold halves are placed in position and toggle locked together, the shim or sleeve 43 will be compressed causing the ends 45 and 46 of the shim to coil more tightly about the batt 42 thus ensuring a weld metal seal about the irregular surface or deformations of the bar. The shim construction thus serves several purposes. Its irresilient characteristics permit it to be employed simply to retain the batt 42 in its wrapped condition around the bar 3 prior to the placement of the mold 47. The shim also serves to girdle or encircle the batt material to prevent the same from entering between the faces forming the parting line 54 of the mold halves when the mold halves are brought into juxtaposed mold forming position by the toggle fixture 51. The shim also serves, due to its pliable nature, more tightly to girdle or enclose the batt 42 when the mold halves are positioned thereabout.

There is then provided a combination refractory mold and molten metal seal assembly wherein the assembly has a metallic smooth cylindrical outer surface which may vary slightly in diameter and an inner refractory batt or fibrous material which will bear against the irregularities or deformations in the bar. Thus the closing of the mold packs the batting material more tightly against the bar deformations without substantially changing the circular exterior thereof and prevents the batt material from becoming interposed between the mold faces to prevent proper mold closure and ensuring no molten metal leakage.

Moreover, with the construction illustrated, it is apparent that the mold 47 may be of a much simpler design simply having throughbores to accommodate the rods 2 and 3 projecting into the weld chamber 56. No complex grooves or ridges are then required which would tend to break out during continued use of the mold. In this manner, a better weld splice is produced with more simplified techniques and less expensive equipment.

When the molten metal has solidified, the mold 47 may then be removed and the fixture 1 may also be removed. In most instances, the shim 43 may simply be unwrapped and the batting 42 removed for reuse. The hardened molten metal may then be trimmed to produce the desired joint configuration.

It will be appreciated that in a vertical joint such as illustrated in FIGS. 3 and 4, no refractory seal is required for the upper bar 2 since metal leakage problems will not be present. However, in the case of a horizontal joint, as illustrated in FIG. 9, shim enclosed refractory seals may be employed on the ends of both bars. Referring now to such FIG. 9, there is illustrated apparatus in accordance with the present invention for producing a joint between metal parts horizontally disposed. The ends of the bars 64 and 65 may each be wrapped with a piece of batting indicated at 66 and 67, respectively, at a slight or predetermined distance back from the ends 68 and 69, respectively. The thin copper shims or sleeves 70 and 71 are then wrapped about the batts 66 and 67 to hold the same in place. The sleeves, which are slightly more narrow than the batts, should ordinarily be positioned in the center of the batting properly to girdle the same. The mold 73, only half of which is shown, is then positioned with the tap hole 74 therein directly over the slightly spaced ends 68 and 69 of the parts 64 and 65 to be joined. The mold halves may be formed with semi-circular grooves providing aligned passages 75 and 76 leading to the weld chamber 77 directly beneath the tap hole 74. The tap hole 74 leads to a crucible so that the charge of exothermic material therein, when ignited, will produce molten metal which will run through the tap hole and into the chamber 77 exothermically welding the ends of the bars 64 and 65 together. The mold 73 is, of course, composed of mating mold halves which may be held and joined by a toggle clamping fixture similar to the fixture 51 shown in FIG. 4. It can accordingly be seen that a simplified mold construction is provided since the aligned passages 75 and 76 in the mold may be produced by drilling through in one operation.

Moreover, the mold thus formed has no internal grooves or ridges which will tend to fracture or break out reducing the life of the mold. The passages 75 and 76 will be slightly smaller than the initial diameter of the sleeve wrapped batting and when the mold halves are clamped together, the shim or sleeve will be coiled more tightly packing the batting ensuring a proper molten metal seal despite the irregularities or deformations in the exterior of the parts to be joined.

Examples of exothermic reaction mixtures may be seen in the aforementioned patents. Although copper is preferred for the thin shim material, any material having the desired irresilient yet pliable characteristics may be employed. As the refractory batting, a layer of asbestos, graphite, carbon or alumina-silica ceramic batting may be employed. Other suitable materials of this nature will, of course, be apparent to one skilled in the art.

As an example, the following techniques or procedures may be employed in the exothermic weld splicing in a horizontal condition of a No. 7 steel reinforcing bar.

First of all, the reinforcing bar ends should be ground or brushed so as to present a clean bright surface for welding. All rust, loose mill scale or dried cement should be removed approximately two to three inches back from the bar ends. The reinforcing bar ends should then be rinsed in a suitable solvent. The bars are then positioned so that approximately a ⅜ inch gap exists between the bar ends and a piece of batting is then wrapped about each bar approximately ⅝" to ¾" back from the end thereof. The batting is then held in place by the copper wrap sleeve. Due to the irresilient characteristics of the sleeve, the batting will be held in place when enclosed thereby. It is ordinarily important that the sleeve be positioned in the center of the batting or in other words that the batting project equally from both ends of the sleeve. With the sleeve thus properly centered and positioned, the exterior surface thereof will be substantially cylindrical better to fit within the mold passages and to prevent batting on either side from becoming interposed between the mold halves. The mold is then placed in position so that the center of the gap between the bars is under the center of the tap hole. The mold is then closed and the operator then follows standard welding procedures to join the ends of the metal parts. For different size bars, the spacing of the batting from the ends of the bars may be varied as well as the gap therebetween.

It can now be seen that there is provided a simplified method and apparatus for the exothermic weld joining of metal parts.

Other modes of applying the principle of the invention may be employed, change being made as regards the details described, provided the features stated in any of the following claims or the equivalent of such be employed.

I, therefore, particularly point out and distinctly claim as my invention:

1. Apparatus for splicing the opposed ends of deformed metal reinforcing bars and the like comprising a refractory mold having a weld chamber therein adapted to receive molten weld metal and the like, passages in said mold entering said chamber adapted to receive such bars with the ends thereof projecting into such chamber, a refractory batting surrounding at least one of such bars, and a thin deformable yet irresilient metallic wrapped on sleeve surrounding said batting and closely conforming to and within the respective passage.

2. Apparatus as set forth in claim 1 wherein said mold comprises mating mold halves which mate in a plane coplanar with the axis of the respective passage, and means to hold said mold halves in mating mold forming position.

3. Apparatus as set forth in claim 2 wherein said wrapped on sleeve is reduced in diameter by the joining of said mold halves thus more tightly to compact said batting.

4. Apparatus as set forth in claim 1 wherein said wrap sleeve comprises a strip of copper which is wrapped in overlapping relationship about said batting.

5. Apparatus as set forth in claim 4 wherein the diameter of the respective passage is such as to tend to constrict said wrapped on sleeve thus more tightly to pack said batting.

6. Apparatus as set forth in claim 1 wherein said wrapped on sleeve is copper.

7. The method of forming a reinforcing bar splice comprising the steps of positioning such bars in end-to-end relationship with a slight gap therebetween, wrapping a refractory batting about at least one of such bars slightly spaced from such gap, wrapping a thin deformable yet irresilient metallic sleeve about such batting to retain the same in place, enclosing such gapped ends with a refractory mold having a weld chamber and a passage leading to such chamber receiving such bar, constricting such sleeve in such passage when enclosing such gapped ends with such refractory mold more tightly to pack such batting, and then introducing molten metal into such mold to join such bars together.

References Cited by the Examiner

UNITED STATES PATENTS

| 1,844,351 | 2/1932 | Falkenstein | 22—125 |
| 1,911,040 | 5/1933 | Schultz | 22—125 |
| 2,756,474 | 7/1956 | Steinmetz. | |
| 2,763,047 | 9/1956 | Laster | 249—90 |
| 2,785,450 | 3/1957 | Willett. | |
| 3,113,359 | 12/1963 | Burke. | |

FOREIGN PATENTS 856,233   12/1960   Great Britain.

J. SPENCER OVERHOLSER, *Primary Examiner.*

ROBERT F. WHITE, *Examiner.*

V. K. RISING, *Assistant Examiner.*